Aug. 24, 1926.
C. A. NICHOLSON
BAGGAGE TRUCK
Filed May 7, 1925
1,596,991
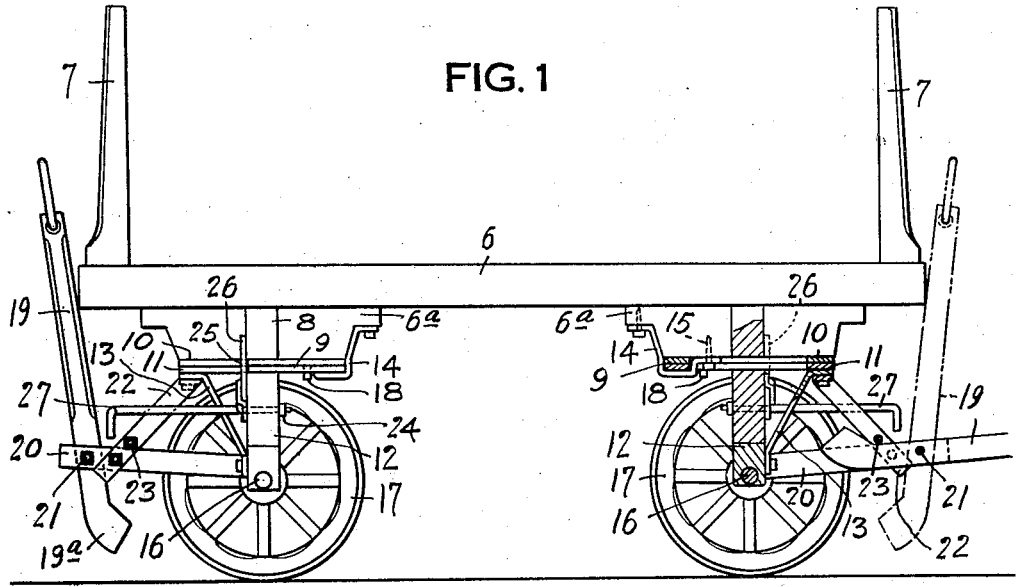
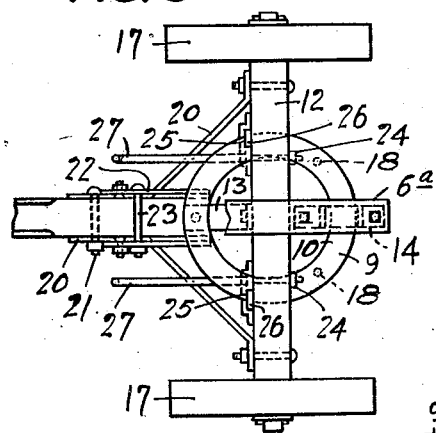
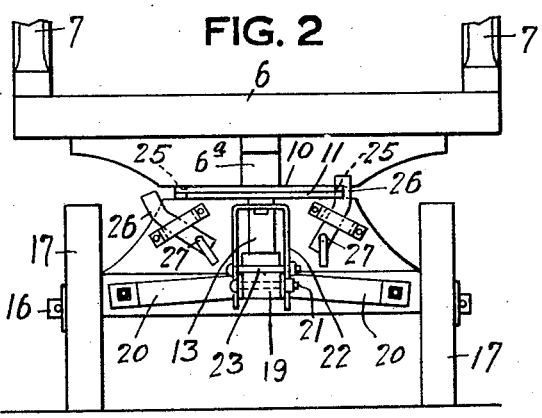
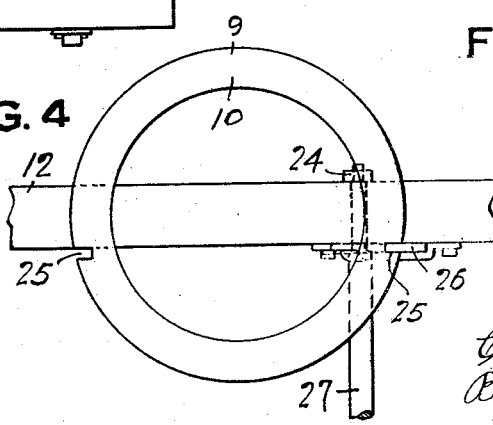
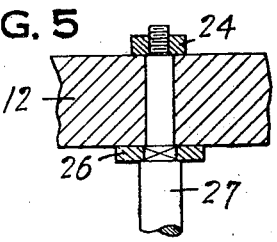
INVENTOR
Charles A. Nicholson
By Kay, Totten & Martin,
Attorneys Patented Aug. 24, 1926.

1,596,991

UNITED STATES PATENT OFFICE.

CHARLES A. NICHOLSON, OF NEW CASTLE, PENNSYLVANIA, ASSIGNOR OF FORTY PER CENT TO WILLIAM H. GLENN, OF NEW CASTLE, PENNSYLVANIA.

BAGGAGE TRUCK.

Application filed May 7, 1925. Serial No. 28,535.

My invention relates to trucks, and particularly to trucks of the character wherein it is desirable to provide steering or guiding wheels at each end thereof so that they may be operated with equal facility from either end.

One object of my invention is to provide a truck having the axles at each end thereof swiveled, together with means for rigidly locking either of said axles, in transverse alignment, against swiveling movement.

Another object of my invention is to provide an improved form of stop for limiting the swiveling movement of an axle or fifth wheel to which the axle is connected.

Another object of my invention is to simplify and improve the construction of fifth wheels and their associated parts.

Still another object of my invention is to simplify and improve generally the structure and arrangement of baggage trucks and the like.

One form which my invention may take is shown in the accompanying drawing, wherein Fig. 1 is a view, partially in side elevation and partially in section, of a baggage truck equipped with my invention; Fig. 2 is an end elevational view thereof; Fig. 3 is a plan view of a portion of the apparatus of Fig. 1, with certain of the superstructure removed; Fig. 4 is an enlarged detail view, partially in plan and partially in section, of one of the fifth wheel members and the locking mechanism therefor, and Fig. 5 is a sectional plan view on an enlarged scale showing the manner in which the actuating means for the lock is mounted.

I have shown my invention as applied to a vehicle of the baggage truck type having a body or platform portion 6 that is provided with the usual standards 7 at its ends. Bolsters or sills 8 are secured to the underside of the body 6.

Fifth wheels 9 are secured at each end of the truck, and the upper plate 10 of each of these wheels is connected to the bolster 8 and the blocks 6ª that are fastened to the body 6. The lower swivel member 11 of the fifth wheel 9 is connected to what might be termed a truck bolster 12 and also by means of a strut 13 which, at its upper end, is bolted to the member 11 and its lower end is connected to the bolster. Yoke members 14 are secured at their upper ends to the blocks 6ª and adjacent to their lower ends extend around the underside of the swivel member 11 and are connected through the upper plate 10 to the blocks 6ª as indicated more clearly at the point 15 in Fig. 1. Additional fastening means, (not shown) may be provided between the upper plate 10 and bolster 8 and lower plate 11 and the bolster 12. Axles 16 are secured to the lower side of the bolsters 12 and the usual wheels 17 mounted thereon. Stop lugs 18 extend downwardly from the swivel member 11 in position to engage the edges of the yoke 14 to limit the swiveling movement of the axles.

A handle 19 is connected to the axle 16 by means of braces or tie members 20 whose inner ends are bolted to the axle and through the outer ends of which a bolt 21 extends to serve as a pivotal mounting for the handle.

Brace members 22, in the form of a yoke, are bolted at their upper ends to the fifth wheel 11 and at their lower ends are bolted to the members 20. A pin 23 extends through the members 22 to limit the upward movement of the inner end of the handle 19. The handle 19 may be of the usual form, weighted at point 19ª to normally hold the handle in its upright position, as indicated at the left hand side of Fig. 1.

The parts thus far described may be operated somewhat after the manner of the usual form of baggage truck, but provision must be made for firmly locking the fifth wheels against swiveling movement, since when a truck is being pulled from one end, even a slight swiveling movement of the wheels at the rear end would cause the wheels to bind on their axles and would perhaps also deflect the rear end of the truck to a dangerous position, such as against a train if the truck were employed on a station platform, or off the platform. By providing a fifth wheel at each end, the truck can be readily operated from either end, thus avoiding the necessity of pushing it backward, which would be dangerous on station platforms since injury to passengers might result. Also, the direction of movement of a truck is more difficult to control when being steered from the rear end. On the other hand, these trucks are often used in close quarters where there is insufficient room to turn them completely around.

In order to lock the fifth wheels I provide slots 25 at each side thereof in such position that when the wheels are in perfect alignment with respect to the bolsters 8, the notches 25 are also in alignment. One set of notches would be sufficient for each fifth wheel, but I prefer to provide two sets, as shown in Fig. 2, so that the operator may readily lock the fifth wheel no matter on which side of the handle 19 he happens to be.

The locking means consists of locking bars 26 that are mounted upon shafts 27 which extend through the bolster 12 and are held in position therein by nuts 24 that engage a shoulder portion at the rear of the shaft 27 so that such nuts will not become unscrewed when the shafts are rotated. The locking bars have rectangular openings to fit correspondingly shaped portions of the shafts 27 so that they will turn with the shafts. The outer ends of the shafts 27 are turned downwardly to form a convenient handle by means of which the shaft may be rotated. At the right hand side of Fig. 2 I have shown the locking bar seated within the notches 25 of the upper and lower fifth wheel members 10 and 11, respectively. This fifth wheel is therefore rigidly secured against rotative movement. At this time the locking bars at the opposite end of the truck will be in released position and the end of the truck shown in Fig. 2 will therefore constitute the rear end.

When it is desired to operate the truck, one of the locking bars 26 at one end of the truck is turned to locking position within the notches 25, as shown on the right hand side of Fig. 2, and both bars 26 at the pull or lead end of the truck are turned to the unlocked position as indicated to the left of said figure.

Instead of providing notches 25 in the outer edges of the fifth wheel members, they may be formed on the inner edges thereof and the locking bars 26 located correspondingly closer to the axis of the fifth wheel. Also, instead of mounting the handle shafts 27 on the lower bolster 12, they can be applied to the upper bolster 8.

I claim as my invention:

1. The combination with a truck body, of an upper fifth wheel member of arcuate form, a lower fifth wheel member of arcuate form, and a yoke partially embracing said fifth wheel members to support them against relative vertical movement but to permit relative swivel movement thereof, the opposite ends of said yoke member being secured to the truck body.

2. The combination with a truck body, of an upper fifth wheel member of arcuate form, a lower fifth wheel member of arcuate form, and a yoke partially embracing said fifth wheel members to support them against relative vertical movement but to permit relative swivel movement thereof, one end of said yoke member being secured to the truck body.

3. The combination with a truck body, of an upper fifth wheel member of arcuate form, a lower fifth wheel member of arcuate form, and a yoke partially embracing said fifth wheel members to support them against relative vertical movement but to permit relative swivel movement thereof, one end of said yoke member being secured to the truck body, and the lower fifth wheel member being provided with a pair of circumferentially spaced stop lugs to either side of said yoke and adapted to engage the yoke to limit swiveling movement.

4. The combination with a truck body, of an upper fifth wheel member of arcuate form, a lower fifth wheel member of arcuate form, and a yoke partially embracing said fifth wheel members to support them against relative vertical movement but to permit relative swivel movement thereof, one end of said yoke member being secured to the truck body, and the lower fifth wheel member being provided with a stop lug positioned to engage said yoke member to limit swiveling movement in one direction.

5. The combination with a vehicle having an upper swivel member, of a truck bolster mounted therebeneath and having a swivel member co-operating with said upper swivel member, a vehicle tongue connected to said bolster, a horizontally disposed shaft rotatably supported by said bolster to one side of said tongue and extending forwardly of the bolster, and a locking bar rigidly secured to said shaft, the upper swivel member being provided with a recess into which said bar may be moved when said recess is in alignment therewith.

6. The combination with a vehicle having an upper swivel member adjacent to each end thereof, of a truck bolster mounted beneath each of said members and each provided with a lower swivel member co-operating with the said upper swivel members, means for connecting a vehicle tongue to each of said bolsters, a horizontally disposed shaft supported by each of said bolsters to one side of said tongue-attaching means and extending outwardly, and a locking bar rigidly secured to each of said shafts in position to engage the adjacent upper swivel member to prevent swiveling movement of the adjacent swivel member.

In testimony whereof I, the said CHARLES A. NICHOLSON, have hereunto set my hand.

CHARLES A. NICHOLSON.